Figure 1:
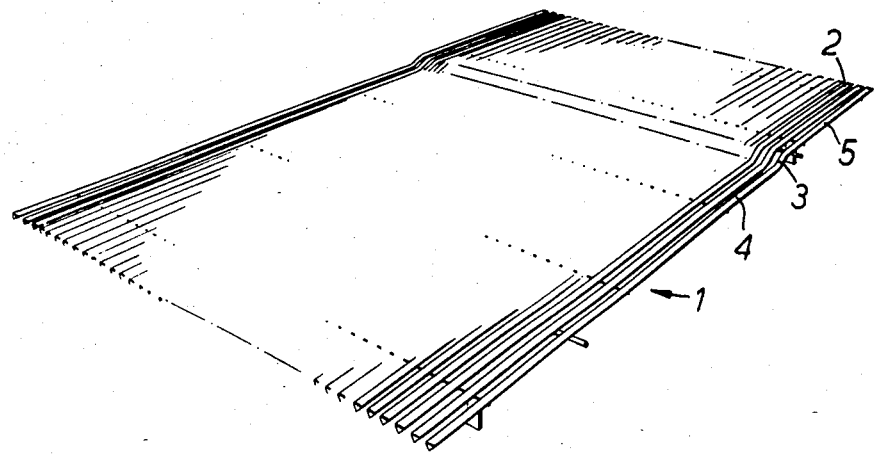

United States Patent [19]

Nooyen

[11] Patent Number: 4,628,662
[45] Date of Patent: Dec. 16, 1986

[54] GRATING FOR USE AS A FLOOR ELEMENT IN A STABLE AND GRATING ASSEMBLY

[76] Inventor: Antonius M. A. Nooyen, Kanveldweg 5, 5754 PM Deurne, Netherlands

[21] Appl. No.: 732,519

[22] Filed: May 9, 1985

[30] Foreign Application Priority Data

May 11, 1984 [NL] Netherlands ............... 8401516

[51] Int. Cl.$^4$ .......................... A01K 1/00; E04C 2/42
[52] U.S. Cl. .................................. 52/660; 119/28
[58] Field of Search ................. 52/660, 671; 119/28

[56] References Cited

U.S. PATENT DOCUMENTS

| | | | |
|---|---|---|---|
| 1,642,324 | 9/1927 | Beckwith | 52/660 X |
| 2,888,818 | 6/1959 | Leuthesser | 52/660 X |
| 4,294,195 | 10/1981 | Rodenberg et al. | 119/28 |
| 4,348,986 | 9/1982 | Marrs | 119/28 X |

FOREIGN PATENT DOCUMENTS

| | | | |
|---|---|---|---|
| 118139 | 9/1984 | European Pat. Off. | 119/28 |
| 2923549 | 1/1980 | Fed. Rep. of Germany | 119/28 |
| 2438140 | 4/1980 | France . | |
| 7902297 | 10/1979 | Netherlands . | |
| 7905924 | 9/1980 | Netherlands . | |

*Primary Examiner*—J. Karl Bell
*Attorney, Agent, or Firm*—Wood, Dalton, Phillips, Mason, & Rowe

[57] ABSTRACT

Grating used as a floor element in a stable and comprising bars arranged side by side and interconnected by transverse joints whereby a plurality of bars are equipped with a profile rising or lowering the bars at one or more places at substantially equal distances from the bar ends or at such a distance that the profile has a continuous pattern.

7 Claims, 3 Drawing Figures

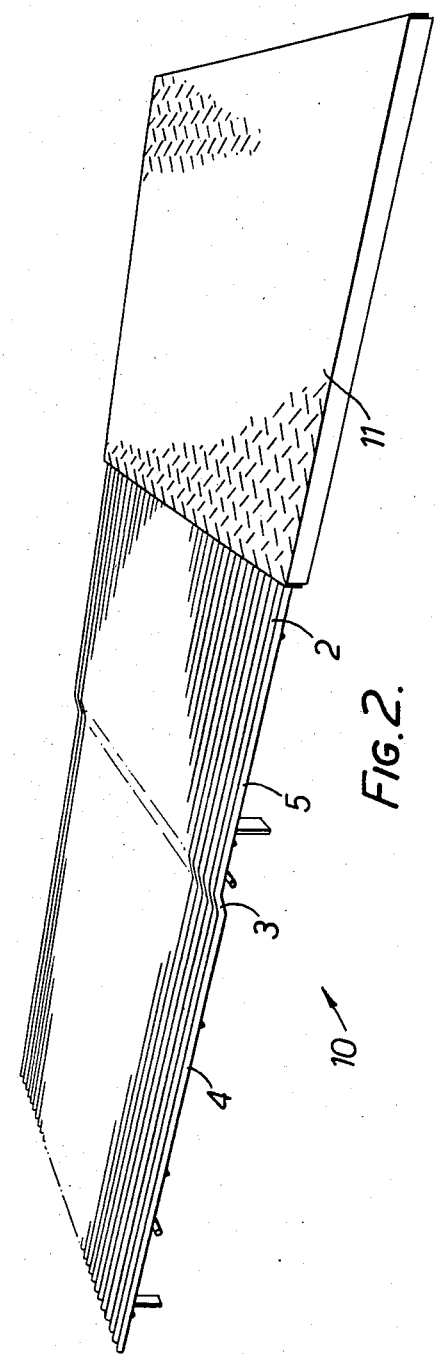

GRATING FOR USE AS A FLOOR ELEMENT IN A STABLE AND GRATING ASSEMBLY

The invention relates to a grating for use as a floor element in a stable comprising bars arranged side by side and interconnected by a transverse joint. Furthermore the invention relates to a grating assembly in which two or more grating elements are adjacent one another so that they can constitute a floor element in a stable. In particular such a grating is suitable for use as a floor element in a pigsty.

Dutch Patent Application No. 7905924 discloses a floor element for an animal stable comprising interconnected bars, in which slipping on the surface is avoided by arranging fillet-shaped elevations in the floor element, so that the grating is built by rectangles in which the bars are arranged. Due to the relatively complicated construction this floor element is expensive and is employed not or substantially not in practice. In known gratings formed by bars slipping is avoided as much as possible by arranging an anti-slipping profile on the ground surface, but a disadvantage of such a profile is that waste, impurities and disease germs can fix in the anti-slipping profile, so that such a profile on the overall bar length is dissuaded by veterinary experts.

A grating of the kind described in the non-prepublished Dutch Patent Application No. 8300534 also in the name of the Applicant has the advantage that a hygienic, readily cleanable surface of the floor element is obtained, on which the animals can get up from a lying position by pushing themselves away from the sides of the bars of the grating. Dutch Patent Application No. 8300534 is particularly directed to that part of the grating which is provided with a heatable part almost completely closed on the top side on which the young pigs can join one another. A grating of the kind described in said Dutch Patent Application provided or not provided with a heatable part can be improved with respect to slipping and pushing away of the animals by means of a grating construction embodying the invention, which is characterized in that a plurality of bars are provided with a profile rising or lowering the bars at one or more places at substantially equal distances from the ends or at a distance such that the profile has a continuous pattern.

In this way an effect of the grating is obtained as is disclosed in Dutch Patent Application No. 7905924, but by the construction embodying the invention this effect can be obtained in a much simpler and cheaper manner.

Figure 3:
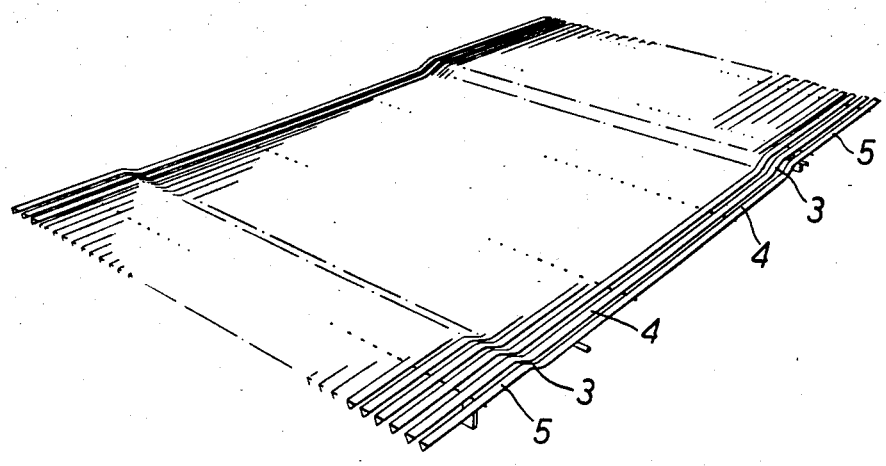

The invention will be described more fully hereinafter, reference being made to the accompanying drawing, in which FIG. 1 shows part of a grating embodying the invention provided with a profile as a pushing-up rim, FIG. 2 shows a grating construction embodying the invention in which part of the grating is provided with a heatable plate and FIG. 3 shows a grating with two profile lines.

Referring to FIG. 1, the grating is designated by 1. The bars 2 are provided with a Z-shaped profile, the upright side of which is designated by 3 and the lower limb of the grating by 4 and the higher limb of the grating by 5.

FIG. 2 shows a similar grating 10, which is provided with a heatable part 11, the construction of which is described in Dutch Patent Application No. 8300534. The grating with the heatable plate represented in FIG. 2 preferably has a ratio between the plate surface and the grating part of 1:6. After about five weeks the piglets have grown to an extent such that they can be transferred to a further stable. This second stable also comprises a heatable plate part and a grating part, in which the surfaces of the two parts are such that the plate surface is about one third to one quarter of the overall surface of plate and grating. The possibility of soiling the plate surface is, indeed, larger and for this reason the plate is provided on the right-hand side (see FIG. 2) with a grating strip of 10 to 30 cms and the heatable plate 11 is constructed in a slightly convex shape. Any excrements dropping on the plate 11 flow away towards the grating parts having the bars 2 or towards the grating strips arranged on the other side.

The difference in height of the profile amounts ot 0.5 to 2.5 cms. The height has been chosen so that the animals lying on the grating can readily push away from the rim of the profile, whilst on the other hand this profile does not or substantially not hinder walking on the grating. Therefore the profile is rounded off, which is an evident advantage with respect to the construction described in Dutch Patent Application No. 7905924. Moreover the possibility of accumulation of dirt or impurities is at a minimum on the profile used in the grating embodying the invention. Along the overall length of the grating a height difference of about 1 cm is substantially not obvious because the gratings are slightly spherically stressed on the pit below the grating.

In the most simple embodiment the grating is provided at one place with such a profile, but it is also possible to arrange this profile at two or more places in the grating, whilst also an elevation extending in one direction can be floowed by a depression so that the ends of the grating will lie on the same level or, in the case of three profiles the height difference amounts to only once the profile height. The embodiment having two profile lines is represented in FIG. 3.

The profile can be arranged in a grating by first constructing the bars to a straight grate as described in Dutch Patent Application No. 8300534 with or without a heatable plate, after which the profile is disposed by means of a press. In a further embodiment not all bars of the grating are provided with this profile, and the outermost bars have no profile, so that the grating elements satisfactorily join one another to form a grating assembly. This is particularly important when the profile is arranged in a wave-shaped form in the grating. By reducing the profile slightly outwards to a height of 0 mm, no undesirable openings are formed between these grating elements.

An important advantage of the grating construction embodying the invention is that the animals getting up from the lying position are prevented from slipping because they can push themselves away from the raised rim. When a sow has to lie down, the movement can be better governed by the sow owing to the profile, so that abrupt drop is avoided and the risk of pressing piglets dead below the sow's body is reduced. Constructively the grating embodying the invention can be obtained with the important advantage that it is now possible to arrange gratings in a transverse direction in a stable, whereas so far the gratings could be disposed only in a direction of length. Disposition in the transverse direction was not possible before, because the animals, in particular sows, when getting up placed their feet in the transverse direction against the bars in order not to slip in the transverse direction. The profile permits a movement both in the direction of length and in the transverse direction, so that the gratings may be disposed in these two directions. Preferably the profile is arranged in the grating at a place such that the profile is located near the hind feet of the animals, which means that the profile is at a distance of one quarter to one half of the grating distance from the end. When more profiles are provided in the grating, they are districuted on the grating that they are located near the front and/or rear feet of the animal.

The bars of the grating preferably have a triangular profile. The advantages of such a triangular shape are generally known i.e. an optimally low weight with respect to the strength of the bar and a ready flow of the manure across the grating. With gratings made from round and flat bars the risk of slipping is, indeed, reduced, but gratings of round bars are less desirable by the builders of stables due to the external shape of the gratings. The bars may be made from steel, in particular stainless steel or from plastic or synthetic resin.

The grating construction embodying the invention permits of forming an assembly for covering a large pit surface in a stable and of obtaining a cheap grating as a floor element, which is safe for the animals.

The figures used in the claims are only meant to explain more clearly the intention of the invention and are not supposed to be any restriction concerning the interpretation of the invention.

I claim:

1. A grating for use as a floor element in a stable comprising a plurality of exposed elongate bars extending longitudinally in spaced-apart relation and interconnected by a transverse joint, said bars being sufficiently close together to enable an animal to walk thereon and being spaced apart to facilitate cleaning of the stable floor characterized in that a plurality of the bars are provided with a bend intermediate their ends to provide a profile as viewed from the side of the grating which has exposed elongate sections of said plurality of bars at two different levels, said bend providing a reaction surface against which an animal may push in getting up or lying down.

2. A grating as defined in claim 1 wherein said plurality of bars each have two spaced-apart bends to provide a profile having two raised sections and an intermediate lower section.

3. A grating as claimed in claim 1 characterized in that a Z-shaped bend is arranged in the bars.

4. A grating as claimed in claim 1 characterized in that the difference of height of the elongate sections is 0.5 to 2.5 cms.

5. A grating as claimed in claim 1 characterized in that the bend is at a distance from the end of the grating which is approximately equal to one-quarter to one-half the length of the grating.

6. A grating as claimed in claim 1 characterized in that the bend occurs at two places in the grating.

7. A grating as claimed in claim 1 characterized in that the bend is not arranged in those bars of the grating which are lying on the outer side and in that the bend is reduced to the outer side to a height of about nil.

* * * * *